(12) United States Patent
Li

(10) Patent No.: US 12,532,328 B2
(45) Date of Patent: Jan. 20, 2026

(54) INFORMATION RECEIVING AND SENDING METHOD, DEVICE AND READABLE STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 351 days.

(21) Appl. No.: 18/031,171

(22) PCT Filed: Oct. 12, 2020

(86) PCT No.: PCT/CN2020/120408
§ 371 (c)(1),
(2) Date: Apr. 11, 2023

(87) PCT Pub. No.: WO2022/077164
PCT Pub. Date: Apr. 21, 2022

(65) Prior Publication Data
US 2023/0379935 A1   Nov. 23, 2023

(51) Int. Cl.
*H04W 4/00*       (2018.01)
*H04J 1/02*       (2006.01)
*H04W 72/232*     (2023.01)
*H04W 72/53*      (2023.01)

(52) U.S. Cl.
CPC ............. *H04W 72/232* (2023.01); *H04J 1/02* (2013.01); *H04W 72/53* (2023.01)

(58) Field of Classification Search
CPC ........................... H04W 72/232; H04W 72/53
See application file for complete search history.

(56) References Cited

U.S. PATENT DOCUMENTS

| | | | |
|---|---|---|---|
| 2013/0195041 A1 | 8/2013 | Papasakellariou et al. | |
| 2013/0242906 A1 | 9/2013 | Li et al. | |
| 2014/0286297 A1 | 9/2014 | Zhao et al. | |
| 2017/0230994 A1* | 8/2017 | You | H04L 5/0053 |
| 2018/0205522 A1* | 7/2018 | Wang | H04L 5/0053 |
| 2019/0123875 A1 | 4/2019 | Guan et al. | |
| 2020/0022168 A1* | 1/2020 | Xu | H04W 16/14 |
| 2020/0221428 A1* | 7/2020 | Moon | H04W 72/23 |

(Continued)

FOREIGN PATENT DOCUMENTS

| | | |
|---|---|---|
| CN | 101714892 A | 5/2010 |
| CN | 108923895 A | 11/2018 |
| CN | 108934068 A | 12/2018 |

(Continued)

OTHER PUBLICATIONS

ZTE, ZTE Microelectronics, "PDCCH procedure and DCI carried by PDSCH region", 3GPP TSG RAN WG1 Meeting #88, R1-1701588, Athens, Greece, Feb. 13-17, 2017.

(Continued)

*Primary Examiner* — Abdelnabi O Musa
(74) *Attorney, Agent, or Firm* — Volpe Koenig

(57) ABSTRACT

An information receiving method, including: determining transmission parameters for downlink control information (DCI), the transmission parameters including a first number and a second number; and receiving the DCI according to the first number and the second number.

17 Claims, 4 Drawing Sheets

(56) References Cited

U.S. PATENT DOCUMENTS

2021/0360701 A1*  11/2021  Xu .................... H04L 5/0048
2023/0125414 A1*  4/2023   Gong ................. H04W 88/025

FOREIGN PATENT DOCUMENTS

| CN | 109392102 A | 2/2019 |
| CN | 109699054 A | 4/2019 |
| CN | 111277362 A | 6/2020 |
| WO | 2020021720 A1 | 1/2020 |

OTHER PUBLICATIONS

ZTE, "Concepts for coverage improvement for MTC UEs", 3GPP TSG RAN WG1 Meeting #78bis, R1-143806, Ljubljana, Slovenia, Oct. 6-10, 2014.

VIVO: "PDCCH-based power saving signal/channel design", 3GPP TSG RAN WG1 #96bis, R1-1904103, Xi'an, China, Apr. 8-12, 2019.

* cited by examiner

INFORMATION RECEIVING AND SENDING METHOD, DEVICE AND READABLE STORAGE MEDIUM

CROSS-REFERENCE TO RELATED APPLICATION

The present application is a U.S. National Stage of International Application No. PCT/CN2020/120408, filed on Oct. 12, 2020, the contents of which are incorporated herein by reference in their entirety for all purposes.

SUMMARY

Examples of the disclosure provide an information receiving and sending method and apparatus, a device, and a readable storage medium.

According to an aspect of the disclosure, there is provided an information receiving method performed by a terminal device, including: determining a transmission parameter for downlink control information (DCI), the transmission parameter including a first number and a second number; and receiving the downlink control information (DCI) according to the first number and the second number.

In another aspect, there is provided an information sending method performed by a network device, including: determining a transmission parameter for downlink control information (DCI), the transmission parameter including a first number and a second number; and sending the downlink control information (DCI) according to the first number and the second number.

In another aspect, there is provided an information receiving apparatus applied to a terminal device, including: a processing module, configured to determine a transmission parameter for downlink control information (DCI), the transmission parameter including a first number and a second number; and a receiving module, configured to receive the downlink control information (DCI) according to the first number and the second number.

In another aspect, there is provided an information sending apparatus applied to a network device, including: a processing module, configured to determine a transmission parameter for downlink control information (DCI), the transmission parameter including a first number and a second number; and a sending module, configured to send the downlink control information (DCI) according to the first number and the second number.

In another aspect, there is provided a terminal device, including: a processor; a transceiver connected with the processor; and a memory configured to store processor-executable instructions; where the processor is configured to load and execute the processor-executable instructions so as to implement the information receiving method described in the examples of the disclosure.

In another aspect, there is provided a network device, including: a processor; a transceiver connected with the processor; and a memory configured to store processor-executable instructions; where the processor is configured to load and execute the processor-executable instructions so as to implement the information sending method described in the examples of the disclosure.

In another aspect, there is provided a non-transitory computer readable storage medium storing at least one instruction, at least one program, a code set or an instruction set, where the at least one instruction, the at least one program, the code set or the instruction set is loaded and executed by a processor to implement the information sending method or the information receiving method described in the examples of the disclosure.

BRIEF DESCRIPTION OF THE DRAWINGS

In order to more clearly illustrate the technical solutions in examples of the disclosure, accompanying drawings needing to be used in the description of the examples will be briefly introduced below. Apparently, the accompanying drawings in the following description are examples of the disclosure. For those ordinarily skilled in the art, other accompanying drawings may further be obtained according to these accompanying drawings without any creative labor.

DETAILED DESCRIPTION

Figure 1:
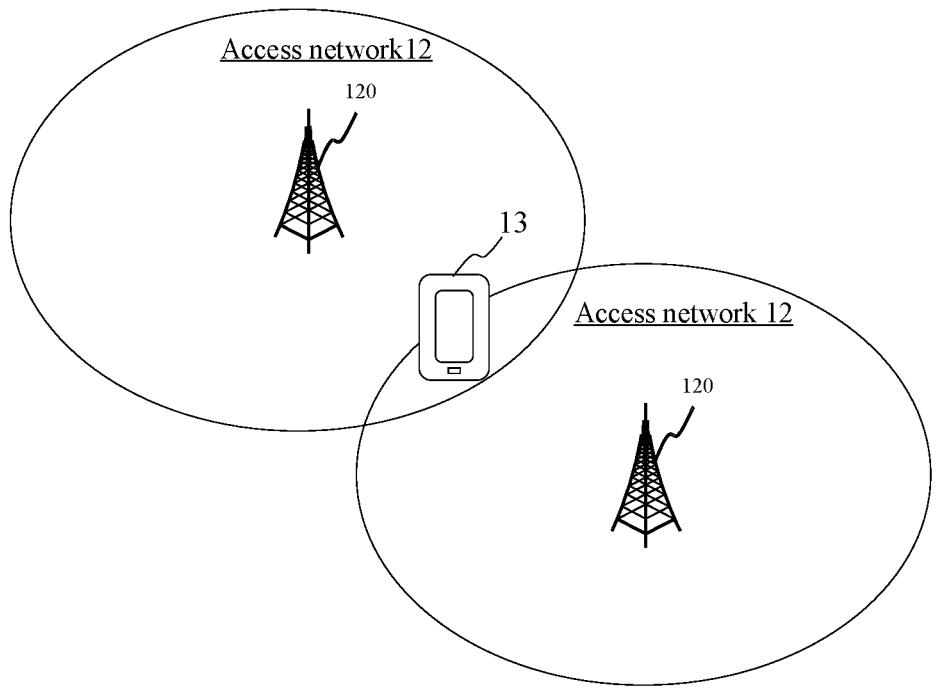
FIG. 1 shows a block diagram of a communication system according to an example of the disclosure.

In order to make objectives, technical solutions and advantages of the disclosure clearer, implementations of the disclosure will be further described in detail below with reference to accompanying drawings.

The disclosure relates to the field of communication, in particular to an information receiving and sending method and apparatus, a device, and a readable storage medium.

In a new radio (NR), due to the rapid attenuation of a high-frequency channel, beams are used to send and receive signals in order to ensure signal coverage. In the case that a base station has more than one transmission reception point (TRP), the base station may use more than one TRP to provide services for a terminal.

In related art, downlink control information (DCI) signaling is mapped to N control channel elements (CCEs) during rate matching, where N is a positive integer greater than 1. In the case that more than one TRP (such as 2 TRPs) is used for sending, each TRP uses N/2 or N CCEs to send the DCI signaling.

However, in the above method, when the terminal performs physical downlink control channel (PDCCH) candidate detection and DCI signaling decoding, the terminal does not know whether a detection number of the CCEs is the same as or different from a mapped number of the CCEs during rate matching, resulting in errors in reception of the DCI signaling.

Examples of the disclosure provide an information receiving and sending method and apparatus, a device, and a readable storage medium, which can improve the accuracy of reception of DCI signaling.

According to an aspect of the disclosure, there is provided an information receiving method performed by a terminal device, including: determining a transmission parameter for downlink control information (DCI), the transmission parameter including a first number and a second number; and receiving the downlink control information (DCI) according to the first number and the second number.

In another aspect, there is provided an information sending method performed by a network device, including: determining a transmission parameter for downlink control information (DCI), the transmission parameter including a first number and a second number; and sending the downlink control information (DCI) according to the first number and the second number.

In another aspect, there is provided an information receiving apparatus applied to a terminal device, including: a processing module, configured to determine a transmission parameter for downlink control information (DCI), the transmission parameter including a first number and a second number; and a receiving module, configured to receive the downlink control information (DCI) according to the first number and the second number.

In another aspect, there is provided an information sending apparatus applied to a network device, including: a processing module, configured to determine a transmission parameter for downlink control information (DCI), the transmission parameter including a first number and a second number; and a sending module, configured to send the downlink control information (DCI) according to the first number and the second number.

In another aspect, there is provided a terminal device, including: a processor; a transceiver connected with the processor; and a memory configured to store processor-executable instructions; where the processor is configured to load and execute the processor-executable instructions so as to implement the information receiving method described in the examples of the disclosure.

In another aspect, there is provided a network device, including: a processor; a transceiver connected with the processor; and a memory configured to store processor-executable-instructions; where the processor is configured to load and execute the processor-executable-instructions so as to implement the information sending method described in the examples of the disclosure.

In another aspect, there is provided a non-transitory computer readable storage medium storing at least one instruction, at least one program, a code set or an instruction set, where the at least one instruction, the at least one program, the code set or the instruction set is loaded and executed by a processor to implement the information sending method or the information receiving method described in the examples of the disclosure.

FIG. 1 shows a block diagram of a communication system according to an example of the disclosure. The communication system may include an access network 12 and a terminal device 13.

The access network 12 includes more than one network device 120. The network device 120 may be a base station, and the base station is an apparatus deployed in the access network to provide a wireless communication function for the terminal device. The base station may include various forms of macro base stations, micro base stations, relay stations, access points, and so on. In systems adopting different wireless access technologies, the names of devices with base station functions may be different. For example, in an LTE system, it is called eNodeB or eNB, and in a 5G NR-U system, it is called gNodeB or gNB. With the evolution of communication technology, the description of "base station" may change. In order to facilitate the description in the examples of the disclosure, the apparatuses that provide the wireless communication functions for the terminal device 13 are collectively called network devices.

The terminal device 13 may include various handheld devices, vehicle-mounted devices, wearable devices, and computing devices with wireless communication functions or other processing devices connected to a wireless modem, as well as various forms of user equipment, mobile stations (MSs), terminal devices, and the like. In order to facilitate description, the devices mentioned above are collectively called terminal devices. The network device 120 and the terminal device 13 communicate with each other through a certain new radio technology, such as a Uu interface.

The technical solutions of the examples of the disclosure may be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-U system, a universal mobile telecommunication system (UMTS), a worldwide interoperability for microwave access (WiMAX) communication system, wireless local area networks (WLANs), wireless fidelity (WiFi), a next-generation communication system or other communication systems.

Generally speaking, a traditional communication system supports a limited number of connections and is easy to implement. However, with the development of communication technology, a mobile communication system will not only support traditional communication, but also support, such as, device-to-device (D2D) communication, machine-to-machine (M2M) communication, machine type communication (MTC), vehicle-to-vehicle (V2V) communication, and a vehicle-to-everything (V2X) system. The examples of the disclosure may also be applied to these communication systems.

In the 5G NR system, the above network devices 120 may be implemented as N transmission reception points (TRPs) instead.

Figure 2:
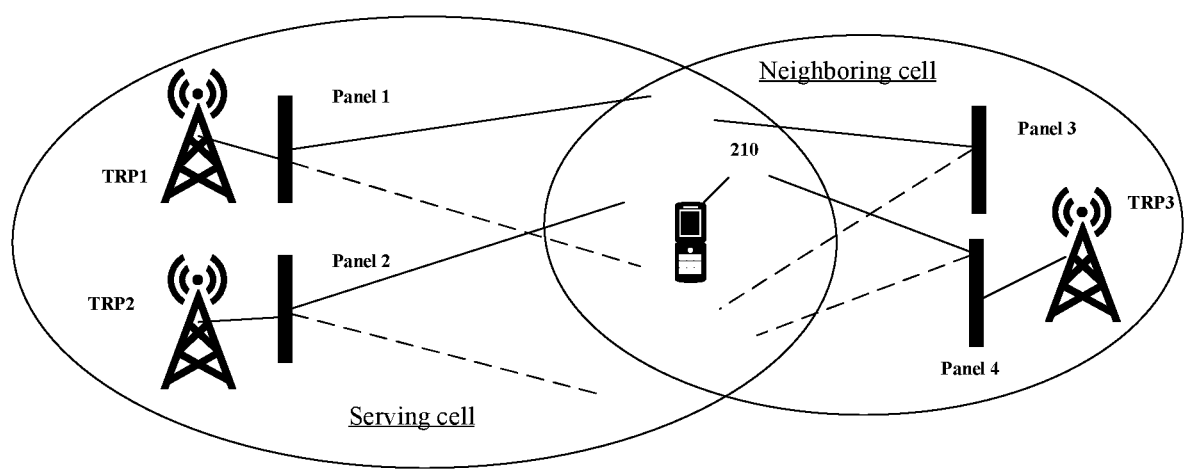
FIG. 2 is a schematic diagram of data transmission based on multi-TRP/panel according to an example of the disclosure.

FIG. 2 shows a schematic diagram of data transmission based on multi-TRP or multi-antenna panel (multi-TRP/panel) according to an example of the disclosure.

A terminal device 210 is located in a serving cell, and the cell may be covered by one or more TRPs. As shown in the figure, the serving cell is jointly covered by a TRP1 and a TRP2, so as to increase a covering radius of the serving cell. A neighboring cell is covered by a TRP3.

Each TRP may be provided with one or more antenna panels. Orientations of different antenna panels may be different, so that beams in different transmission directions may be received and sent, so as to realize multi-space diversity. The network device may use more than one antenna panel (more than one antenna panel may come from the same TRP or different TRPs) to simultaneously send a PDCCH to the terminal device 210. In this case, different antenna panels perform sending in different directions, and the terminal device 210 may also use different antenna panels to receive the physical downlink control channel (PDCCH), and the network device needs to indicate different transmission configuration indication (TCI) states to the terminal device, where each TCI state corresponds to one beam-receiving-direction of each antenna panel of the terminal device. The above sending and receiving modes based on beams may ensure the coverage.

In the NR, especially for a communication frequency band being in a frequency range 2 (a high-frequency band), a high-frequency channel rapidly attenuates, and beam-based sending and receiving are needed in order to ensure the coverage. In the case that a base station has more than one TRP, the base station may use more than one TRP to provide services for a terminal. For example, the base station may use more than one TRP to send the PDCCH to the terminal. In a traditional method, in the case that the base station uses one TRP to send the PDCCH to the terminal, DCI signaling is mapped to N control channel elements (CCEs) during rate matching, and this TRP uses the N CCEs to send the DCI signaling to the terminal, where N is a positive integer greater than 1. In the case that the base station uses more than one TRP to send the PDCCH to the terminal, there are more than one sending mode as follows.

The first sending mode is as following: the DCI signaling is mapped to N CCEs during rate matching, and in the case that more than one TRP is used for sending, each TRP uses the N CCEs to send the DCI signaling, and each TRP may send complete content or partial content of the DCI signaling.

The second sending mode is as following: the DCI signaling is mapped to N CCEs during rate matching, and in the case that more than one TRP (such as 2 TRPs) is used for sending, each TRP uses N/2 CCEs to send the DCI signaling, and each TRP may send complete content or partial content of the DCI signaling.

Figure 3:
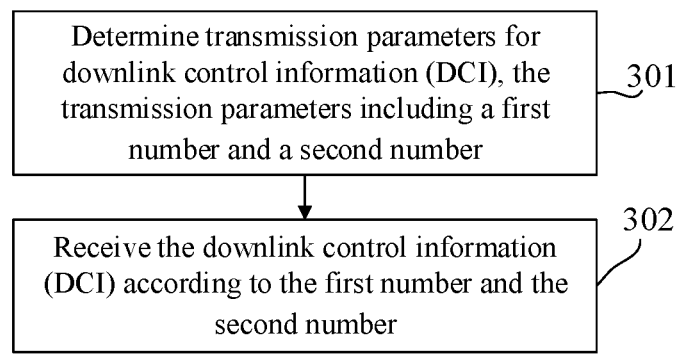
FIG. 3 shows a flow chart of an information sending method according to an example of the disclosure.

FIG. 3 shows a flowchart of an information receiving method according to an example of the disclosure. A situation that the method is performed by the terminal device shown in FIG. 1 is taken as an example for illustration. As shown in FIG. 3, the method includes steps 301 and 302.

Step 301 includes determining a transmission parameter for downlink control information (DCI), where the transmission parameter includes a first number and a second number In some examples, the first number is configured to indicate a first quantity of control channel elements (CCEs) that are occupied respectively in at least two beam directions in a physical downlink control channel (PDCCH) that transmits DCI signaling, and the second number is configured to indicate a second quantity of the CCEs during at least one of rate matching or decoding of the DCI in a process of receiving.

In some examples, the first number and the second number may be configured in a manner opposite to the above-mentioned manner. In the example of the disclosure, the above-mentioned manner is taken as an example for illustration.

That is, the DCI signaling is transmitted in at least two beam directions, and partial content of the DCI is transmitted in each beam direction; that is, all beams jointly send the complete content of one piece of DCI. Alternatively, the complete content of the DCI is transmitted in each beam direction.

In an example, partial content of the DCI is transmitted in each beam direction, and complete DCI signaling is obtained by splicing partial content transmitted in each beam direction. In an example, the complete content of the DCI is transmitted in each beam direction, and complete DCI signaling may be obtained according to the complete content transmitted in each beam direction.

In an example, the first number indicates the first quantity of the CCEs occupied respectively in at least two beam directions in the PDCCH that transmits the DCI signaling, and the first number may be implemented in any one of the following modes.

The first mode is as following: the first number includes a single value, the single value is configured to indicate the number of the CCEs occupied respectively by the DCI transmitted in at least two beam directions, and the number of the CCEs occupied respectively in the at least two beam directions is the same, that is, both are the single value in the first number.

In an example, the first number includes the single value, and the second number is an integer multiple of the single value.

In some examples, the second number corresponds to the quantity of the beam directions. Alternatively, the second number is equal to the single value.

Illustratively, partial content of the DCI is transmitted in each beam direction of the at least two beam directions, and the integer multiple corresponds to the quantity of the beam directions. Illustratively, the complete content of the DCI is transmitted in each beam direction of at least two beam directions, and a value of the second number is equal to the above single value. In some examples, the second number corresponds to the quantity of the beam directions, and a ratio between the second number and the above single value is consistent with the quantity of the beam directions.

In some examples, for a certain beam direction, the base station may configure more than one value of the first number, namely, more than one candidate value, and the first number is an aggregation level (AL) of PDCCH candidates, that is, the number of the CCEs occupied by the PDCCH candidates. During configuration by the base station, the number of the PDCCH candidates may be given for each aggregation level. For example, the aggregation level is 2, and there are 4 PDCCH candidates; the aggregation level is 4, and there are 2 PDCCH candidates; and the aggregation level is 8, and there are 2 PDCCH candidates. A worst case is that the terminal needs to detect each PDCCH candidate of each aggregation level, that is, a total of 8 PDCCH candidates, and when the terminal detects that one of the PDCCH candidates is sending DCI signaling that the terminal needs to receive, the terminal needs not to detect subsequent PDCCH candidates anymore, so that the aggregation level of the PDCCH candidates is determined to be the value of the first number. In some examples, the base station configures one aggregation level. For example, the number of the PDCCH candidates of other aggregation levels is configured as 0. The first number may be determined directly according to the configuration by the base station. The aggregation level is an attribute of a search space. The aggregation level is the number of the CCEs that constitute one PDCCH. A protocol standard defines more than one aggregation level, such as 1, 2, 4, 8, and 16. That is, one PDCCH may be formed by aggregation of successive CCEs, such as 1, 2, 4, 8, and 16 CCEs.

The second mode is as follows: the first number includes at least two first values, the at least two first values are configured to indicate the number of the CCEs occupied respectively by the DCI transmitted in different beam directions, and at least two of the beam directions correspond to different numbers of the CCEs.

Illustratively, a beam 1 corresponds to a value 1 in the at least two first values, and a beam 2 corresponds to a value 2 in the at least two first values.

In some examples, the second number is the same as a sum of the first values in each beam direction in the first number; alternatively, the second number includes at least two second values, and the second values correspond to the first values one-to-one.

Illustratively, partial content of the DCI is transmitted in each beam direction of the at least two beam directions, and the second number is the same as a sum of the first values corresponding to each beam direction in the first number; alternatively, complete content of the DCI is transmitted in each beam direction of the at least two beam directions, and the second number includes at least two second values, and the second values correspond to the first values in the above first number one to one.

Illustratively, the complete content of the DCI is transmitted in each beam direction. For example, the beam 1 transmits the DCI signaling using 4 CCEs, so the first number includes a first value of 4, the second number includes a second value of 4, and the first value and the second value corresponding to each other; and the beam 2 transmits the DCI signaling using 8 CCEs, so the first number includes a first value of 8, the second number includes a second value of 8, and the first value and the second value corresponding to each other.

In an example, the terminal determines the first number and the second number in the transmission parameter for the DCI through any one of the following modes.

The first mode is as follows: the terminal receives first indication signaling sent by a network device, the first indication signaling includes a first indication field, the first indication field is configured to indicate a transmission mode and a transmission number of a PDCCH, where the transmission number includes candidate number sets for the first number.

In some examples, the candidate number sets for the first number corresponding to different beam directions are the same or different. For determining the first number and the second number, a target PDCCH candidate carrying the DCI to the terminal is determined, and a number of the CCEs occupied by the target PDCCH candidate is determined as the first number; and the second number is determined according to the first number and the transmission mode of the PDCCH.

Illustratively, a search unit for the CCEs is determined according to the candidate number sets. Each PDCCH candidate is searched for on the PDCCH by using the search unit until a target PDCCH candidate carrying the DCI that needs to be received by the terminal is searched, so the number of the CCEs occupied by the target PDCCH candidate is determined as the first number, and the second number is determined according to the first number and the transmission mode of the PDCCH. It is worth noting that the above process of searching for and determining the first number and the second number is performed for a single beam direction.

Correspondences between the second number and the first number are different for different transmission modes of the PDCCH, that is, under different transmission modes of the PDCCH, the first number and the second number are the same, or alternatively, the second number is a sum of the first numbers in more than one beam direction.

In an example, the transmission mode of the PDCCH includes any one of a space division multiplexing method, a frequency division multiplexing method, an intra-slot time division multiplexing method, or an inter-slot time division multiplexing method.

For different transmission modes of the PDCCH, the correspondences between the second number and the first number include any one of the following.

1) Space Division Multiplexing (SDM) Method
  1.1 Complete content of the DCI is sent in each beam direction of more than one beam direction
    1.1.1 The second number is equal to the first number
    1.1.2 The second number is N times the first number, with N being a positive integer
    In an example, the first number is configured to indicate a first quantity of the CCEs occupied respectively in the beam directions in the PDCCH that transmits the DCI, and the complete content of the DCI is transmitted in each beam direction, so a value of N is 1.
  1.2 Partial content of the DCI is sent in each beam direction of more than one beam direction
    1.2.1 The second number is equal to the first number
    1.2.2 The second number is N times the first number
    In an example, the first number is configured to indicate a first quantity of the CCEs occupied respectively in the beam directions in the PDCCH that transmits the DCI, and the partial content of the DCI is transmitted in each beam direction, so a value of N corresponds to the quantity of the beam directions. For example, the value of N is a ratio of the second number to a CCE indication value corresponding to the current beam direction in the first number.
2) Frequency Division Multiplexing (FDM) Method
  2.1 Complete content of the DCI is sent in each beam direction of more than one beam direction
    2.1.1 The second number is equal to the first number
    2.1.2 The second number is N times the first number
    In an example, the first number is configured to indicate a first quantity of the CCEs occupied respectively in the beam directions in the PDCCH that transmits the DCI, and the complete content of the DCI is transmitted in each beam direction, so a value of N is 1.
  2.2 Partial content of the DCI is sent in each beam direction of more than one beam direction
    2.2.1 The second number is equal to the first number
    2.2.2 The second number is N times the first number
    In an example, the first number is configured to indicate a first quantity of the CCEs occupied respectively in the beam directions in the PDCCH that transmits the DCI, and the partial content of the DCI is transmitted in each beam direction, so a value of N corresponds to the quantity of the beam directions. For example, the value of N is a ratio of the second number to a CCE indication value corresponding to the current beam direction in the first number.
3) Intra-Slot Time Division Multiplexing (Intra-TDM) Method
  3.1 Complete content of the DCI is sent in each beam direction of more than one beam direction
    3.1.1 The second number is equal to the first number
    3.1.2 The second number is N times the first number
    In an example, the first number is configured to indicate a first quantity of the CCEs occupied respectively in the beam directions in the PDCCH that transmits the DCI, and the complete content of the DCI is transmitted in each beam direction, so a value of N is 1.
  3.2 Partial content of the DCI is sent in each beam direction of the more than one beam direction
    3.2.1 The second number is equal to the first number
    3.2.2 The second number is N times the first number
    In an example, the first number is configured to indicate a first quantity of the CCEs occupied respectively in the beam directions in the PDCCH that transmits the DCI, and the partial content of the DCI is transmitted in each beam direction, so a value of N corresponds to the quantity of the beam directions. For example, the value of N is a ratio of the second number to a CCE indication value corresponding to the current beam direction in the first number.

4) Inter-Slot Time Division Multiplexing (Inter-TDM) Method 4.1 Complete content of the DCI is sent in each beam direction of more than one beam direction 4.1.1 The second number is equal to the first number 4.1.2 The second number is N times the first number In an example, the first number is configured to indicate a first quantity of the CCEs occupied respectively in the beam directions in the PDCCH that transmits the DCI, and the complete content of the DCI is transmitted in each beam direction, so a value of N is 1.

4.2 Partial content of the DCI is sent in each beam direction of more than one beam direction 4.2.1 The second number is equal to the first number 4.2.2 The second number is N times the first number In an example, the first number is configured to indicate a first quantity of the CCEs occupied respectively in the beam directions in the PDCCH that transmits the DCI, and the partial content of the DCI is transmitted in each beam direction, so a value of N corresponds to the quantity of the beam directions. For example, the value of N is a ratio of the second number to a CCE indication value corresponding to the current beam direction in the first number.

That is, according to the above description, the transmission mode of the PDCCH includes the partial content of the DCI being transmitted in each beam direction, or alternatively, the transmission mode of the PDCCH includes the complete content of the DCI being transmitted in each beam direction.

The second mode is as following: the terminal receives a second indication signaling sent by a network device, the second indication signaling includes a second indication field, the second indication field is configured to indicate the first number and the second number, that is, the second indication signaling is configured to explicitly indicate the first number and the second number.

In an example, each of the at least two beams corresponds to different reference signals (RSs), and the reference signals correspond to reference signals for different transmission reception points (TRPs) of a serving cell, respectively, or alternatively, the reference signals correspond to reference signals for the serving cell and a neighboring cell, respectively.

Step 302 includes receiving the downlink control information (DCI) according to the first number and the second number.

Illustratively, the first number is 1, and the terminal searches for the PDCCH candidate with 1 CCE as a unit until the terminal detects that DCI signaling carried by a certain CCE needs to be received by the terminal. For example, the first number is 4, so the terminal searches for the PDCCH candidate with 4 successive CCEs as the unit until the terminal detects that DCI signaling sent on 4 successive CCEs needs to be received by the terminal.

To sum up, according to the information receiving method provided by the examples of the disclosure, the transmission parameter for the DCI is determined. That is, the first number and the second number for DCI transmission are determined, in this way, the number of blind detections performed by the terminal during receiving the DCI is reduced by determining the first number for the DCI transmission, and the terminal is facilitated to accurately decode the DCI signaling by determining the second number.

Figure 4:
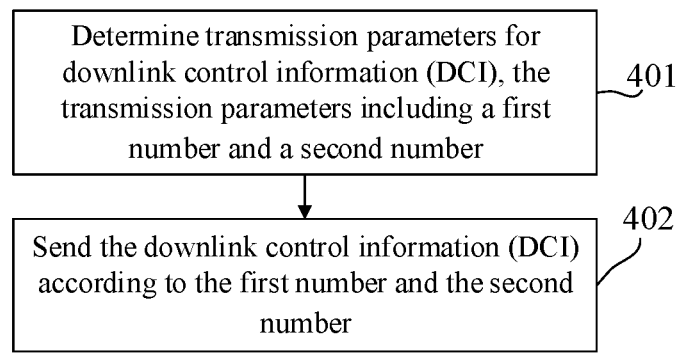
FIG. 4 is a flow chart of an information receiving method according to another example of the disclosure.

FIG. 4 is a flowchart of an information sending method according to another example of the disclosure. A situation that the method is applied to a network device is taken as an example for illustration. As shown in FIG. 4, the method includes steps 401 and 402.

Step 401 includes determining a transmission parameter for downlink control information (DCI), where the transmission parameter includes a first number and a second number.

In some examples, the first number is configured to indicate a first quantity of control channel elements (CCEs) that are occupied respectively in at least two beam directions in a physical downlink control channel (PDCCH) that transmits DCI signaling, and the second number is configured to indicate a second quantity of the CCEs during at least one of rate matching or decoding of the DCI in a process of receiving.

In an example, the first number indicates the first quantity of the CCEs occupied respectively in at least two beam directions in the PDCCH that transmits the DCI signaling, and the first number may be implemented in any one of the following modes.

The first mode is as following: the first number includes a single value, the single value is configured to indicate the number of the CCEs occupied respectively by the DCI transmitted in at least two beam directions, and the number of the CCEs occupied respectively in the at least two beam directions is the same, that is, both are the single value in the first number.

In an example, the first number includes the single value, and the second number is an integer multiple of the single value.

The second number corresponds to the quantity of the beam directions. Alternatively, the second number is equal to the single value.

Illustratively, partial content of the DCI is transmitted in each beam direction of the at least two beam directions, and the integer multiple corresponds to the quantity of the beam directions. Illustratively, complete content of the DCI is transmitted in each beam direction of the at least two beam directions, and a value of the second number is equal to the above single value. In some examples, the second number corresponds to the quantity of the beam directions, and a ratio between the second number and the above single value is consistent with the quantity of the beam directions.

The second mode is as follows: the first number includes at least two first values, the at least two first values are configured to indicate the number of the CCEs occupied respectively by the DCI transmitted in different beam directions, and at least two of the beam directions correspond to different numbers of the CCEs.

In some examples, the second number is the same as a sum of the first values in each beam direction in the first number; alternatively, the second number includes at least two second values, and the second values correspond to the first values one to one.

Illustratively, partial content of the DCI is transmitted in each beam direction of at least two beam directions, and the second number is the same as a sum of the first values corresponding to each beam direction in the first number; alternatively, the complete content of the DCI is transmitted in each beam direction of the at least two beam directions, and the second number includes at least two second values, and the second values correspond to the first values in the above first number one to one.

In an example, each of the at least two beams corresponds to different reference signals (RSs), and the reference signals correspond to reference signals for different transmission reception points (TRPs) of a serving cell, respectively, or alternatively, the reference signals correspond to reference signals for the serving cell and a neighboring cell, respectively.

In an example, after determining the transmission parameter, the network device further sends indication signaling to a terminal, and the indication signaling includes any one of first indication signaling or second indication signaling.

The first indication signaling includes a first indication field. The first indication field is configured to indicate a transmission mode and a transmission number of a PDCCH, and the transmission number corresponds to candidate number sets for the first number.

The second indication signaling includes a second indication field. The second indication field is configured to indicate the first number and the second number. That is, the second indication field is an explicit indication field and is configured to explicitly indicate the first number and the second number.

From the above, it can be seen that the network device sends the first indication signaling to the terminal, or the network device sends the second indication signaling to the terminal.

Step 402 includes sending the downlink control information (DCI) according to the first number and the second number.

To sum up, according to the information receiving method provided by the examples of the disclosure, the transmission parameter for the DCI is determined, that is, the first number and the second number for DCI transmission are determined. In this way, the number of blind detections performed by the terminal during receiving the DCI is reduced by determining the first number for the DCI transmission, and the terminal is facilitated to accurately decode the DCI signaling by determining the second number.

Figure 5:
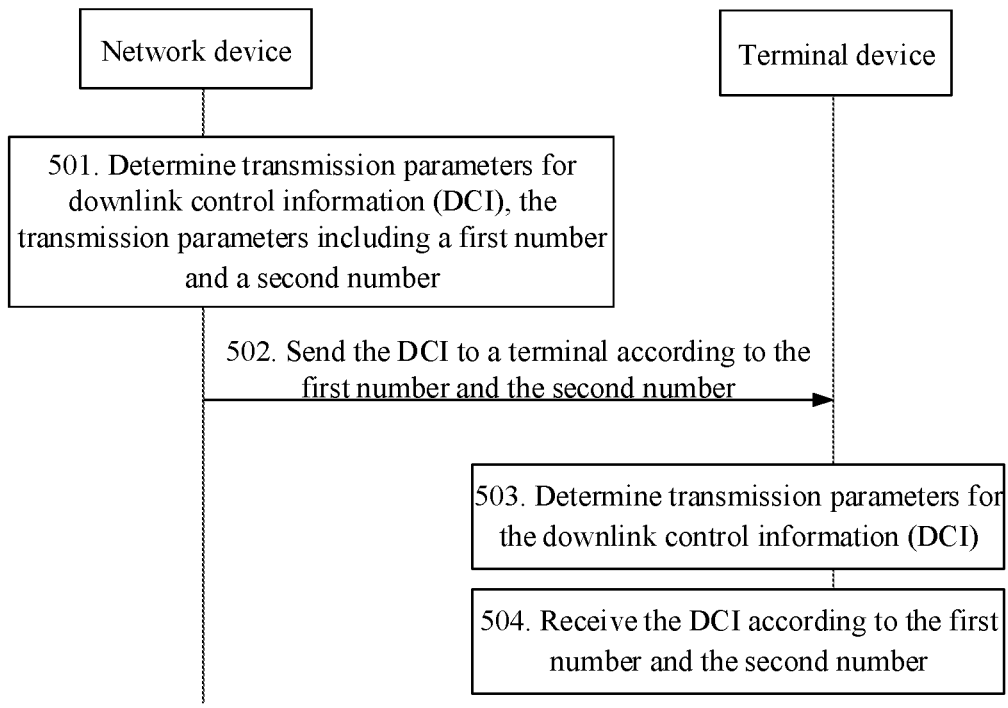
FIG. 5 is a flow chart of information sending and receiving methods according to another example of the disclosure.

FIG. 5 is a flowchart of information sending and receiving method according to another example of the disclosure. A situation that the method is applied to the communication system shown in FIG. 1 is taken as an example for illustration. As shown in FIG. 5, the method includes steps 501 to 504.

Step 501 includes a network device determining a transmission parameter for downlink control information (DCI), where the transmission parameter includes a first number and a second number.

In some examples, the first number is configured to indicate a first quantity of control channel elements (CCEs) that are occupied respectively in at least two beam directions in a physical downlink control channel (PDCCH) that transmits DCI signaling, and the second number is configured to indicate a second quantity of the CCEs during at least one of rate matching or decoding of the DCI in a process of receiving.

In an example, the first number indicates the first quantity of the CCEs occupied respectively in at least two beam directions in the PDCCH that transmits the DCI signaling, and the first number may be implemented in any one of the following modes.

The first mode is as following: the first number includes a single value, the single value is configured to indicate the number of the CCEs occupied respectively by the DCI transmitted in at least two beam directions, and the number of the CCEs occupied respectively in the at least two beam directions is the same, that is, both are the single value in the first number.

In an example, the first number includes the single value, and the second number is an integer multiple of the single value.

In some examples, the second number corresponds to the quantity of the beam directions. Alternatively, the second number is equal to the single value.

Illustratively, partial content of the DCI is transmitted in each beam direction of at least two beam directions, and the integer multiple corresponds to the quantity of the beam directions. Illustratively, the complete content of the DCI is transmitted in each beam direction of at least two beam directions, and a value of the second number is equal to the above single value.

In some examples, the second number corresponds to the quantity of the beam directions, and a ratio between the second number and the above single value is consistent with the quantity of the beam directions.

The second mode is as follows: the first number includes at least two first values, at least two first values are configured to indicate the number of the CCEs occupied respectively by the DCI transmitted in different beam directions, and at least two of the beam directions correspond to different numbers of the CCEs.

In some examples, the second number is the same as a sum of the first values in each beam direction in the first number; alternatively, the second number includes at least two second values, and the second values correspond to the first values one to one.

Illustratively, partial content of the DCI is transmitted in each beam direction of at least two beam directions, and the second number is the same as a sum of the first values corresponding to each beam direction in the first number; alternatively, the complete content of the DCI is transmitted in each beam direction of the at least two beam directions, and the second number includes at least two second values, and the second values correspond to the first values in the above first number one to one.

In an example, each of the at least two beams corresponds to different reference signals (RSs), and the reference signals correspond to reference signals for different transmission reception points (TRPs) of a serving cell, respectively, or alternatively, the reference signals correspond to reference signals for the serving cell and a neighboring cell respectively.

In an example, after determining the transmission parameter, the network device further sends indication signaling to a terminal, and the indication signaling includes any one of first indication signaling or second indication signaling.

The first indication signaling includes a first indication field, the first indication field is configured to indicate a transmission mode and a transmission number of a PDCCH, and the transmission number corresponds to candidate number sets for the first number.

The second indication signaling includes a second indication field, the second indication field is configured to indicate the first number and the second number. That is, the second indication field is an explicit indication field and is configured to explicitly indicate the first number and the second number.

From the above, it can be seen that the network device sends the first indication signaling to the terminal, or the network device sends the second indication signaling to the terminal.

Step 502 includes the network device sending the DCI to the terminal according to the first number and the second number.

Step 503 includes the terminal determining the transmission parameter for the downlink control information (DCI).

In an example, the terminal determines the first number and the second number in the transmission parameter for the DCI through any one of the following modes.

The first mode is as follows: the terminal receives first indication signaling sent by a network device, the first indication signaling includes a first indication field, the first indication field is configured to indicate a transmission mode and a transmission number of a PDCCH, where the transmission number includes candidate number sets for the first number.

In some examples, the candidate number sets for the first number corresponding to different beam directions are the same or different. For determining the first number and the second number, a search unit for the CCEs is determined according to the candidate number sets.

Each PDCCH candidate is searched for on the PDCCH by using the search unit until a target PDCCH candidate carrying the DCI that needs to be received by the terminal is searched, so the number of the CCEs occupied by the target PDCCH candidate is determined as the first number, and the second number is determined according to the first number and the transmission mode of the PDCCH. It is worth noting that the above process of searching for and determining the first number and the second number is performed for a single beam direction.

Correspondences between the second number and the first number are different for different transmission modes of the PDCCH. That is, under different transmission modes of the PDCCH, the first number and the second number are the same, or alternatively, the second number is a sum of the first numbers in more than one beam direction.

In an example, the transmission mode of the PDCCH includes any one of a space division multiplexing method, a frequency division multiplexing method, an intra-slot time division multiplexing method, or an inter-slot time division multiplexing method.

In an example, the transmission mode of the PDCCH includes any one of: partial content of the DCI being transmitted in each beam direction; or the complete content of the DCI being transmitted in each beam direction.

The second mode is as following: the terminal receives the second indication signaling sent by the network device, the second indication signaling includes the second indication field, the second indication field configured to indicate the first number and the second number, that is, the second indication signaling is configured to explicitly indicates the first number and the second number.

Step 504 includes the terminal receiving the DCI according to the first number and the second number.

Illustratively, the first number is 1, and the terminal searches for the PDCCH candidate with 1 CCE as a unit until the terminal detects that DCI signaling carried by a certain CCE needs to be received by the terminal. For example, the first number is 4, so the terminal searches for the PDCCH candidate with 4 successive CCEs as the unit until the terminal detects that DCI signaling sent on 4 successive CCEs needs to be received by the terminal.

To sum up, according to the information receiving method provided by the examples of the disclosure, the transmission parameter for the DCI is determined, that is, the first number and the second number for DCI transmission are determined, in this way, the number of blind detections performed by the terminal during receiving the DCI is reduced by determining the first number for the DCI transmission, and the terminal is facilitated to accurately decode the DCI signaling by determining the second number.

Figure 6:
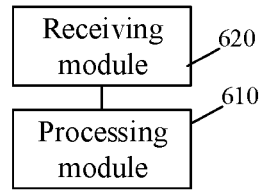
FIG. 6 is a structural block diagram of an information receiving apparatus according to an example of the disclosure.

FIG. 6 is a structural block diagram of an information receiving apparatus according to an example of the disclosure. As shown in FIG. 6, the apparatus includes: a processing module 610, configured to determine a transmission parameter for downlink control information (DCI), where the transmission parameter includes a first number and a second number; and a receiving module 620, configured to receive the downlink control information (DCI) according to the first number and the second number.

In an example, the first number is configured to indicate a first quantity of control channel elements (CCEs) that are occupied respectively in at least two beam directions in a physical downlink control channel (PDCCH) that transmits the DCI; and the second number is configured to indicate a second quantity of the CCEs during at least one of rate matching or decoding of the DCI in a process of receiving.

In an example, the first number includes a single value. The single value is configured to indicate the number of the CCEs occupied respectively by the DCI transmitted in at least two beam directions, and the number of the CCEs occupied respectively in at least two beam directions is the same.

In an example, the second number is an integer multiple of the single value.

In an example, the integer multiple corresponds to the quantity of the beam directions; or the second number is equal to the single value.

In an example, the first number includes at least two first values, the at least two first values are configured to indicate the number of the CCEs occupied respectively by the DCI transmitted in different beam directions, and at least two of the beam directions correspond to different numbers of the CCEs.

In an example, the second number is equal to a sum of the first values corresponding to each beam direction in the first number.

In an example, the second number includes at least two second values, and the second values correspond to the first values one to one.

In an example, the receiving module 620 is further configured to receive the first indication signaling sent by a network device. The first indication signaling includes a first indication field. The first indication field is configured to indicate a transmission mode and a transmission number of the PDCCH, where the transmission number corresponds to the candidate number sets for the first number.

In an example, the candidate number sets for the first number corresponding to different beam directions are the same or different.

In an example, the processing module 610 is further configured to determine a target PDCCH candidate carrying the DCI to the terminal, and to determine the number of the CCEs occupied by the target PDCCH candidate as the first number.

In an example, the processing module 610 is further configured to determine the second number according to the first number and the transmission mode of the PDCCH.

In an example, the correspondences between the second number and the first number are different for different transmission modes of the PDCCH.

In an example, the transmission mode of the PDCCH includes any one of a space division multiplexing method, a frequency division multiplexing method, an intra-slot time division multiplexing method, or an inter-slot time division multiplexing method.

In an example, the transmission mode of the PDCCH includes at least one of: partial content of the DCI being transmitted in each beam direction; or, complete content of the DCI being transmitted in each beam direction.

In an example, the receiving module 620 is further configured to receive a second indication signaling sent by the network device. The second indication signaling includes a second indication field. The second indication field is configured to indicate the first number and the second number.

In an example, each of the at least two beams corresponds to different reference signals; and the reference signals correspond to reference signals for different transmission reception points of a serving cell, respectively, or the reference signals correspond to reference signals for the serving cell and a neighboring cell, respectively.

Figure 7:
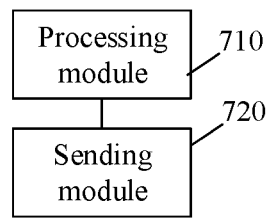
FIG. 7 is a structural block diagram of an information sending apparatus according to another example of the disclosure.

FIG. 7 is a structural block diagram of an information sending apparatus according to an example of the disclosure. As shown in FIG. 7, the apparatus includes: a processing module 710, configured to determine a transmission parameter for downlink control information (DCI), the transmission parameter including a first number and a second number; and a sending module 720, configured to send the downlink control information (DCI) according to the first number and second number.

In an example, the sending module 720 is further configured to send a first indication signaling to a terminal. The first indication signaling includes a first indication field. The first indication field is configured to indicate a transmission mode and a transmission number of a PDCCH, where the transmission number corresponds to a candidate number sets for the first number.

In an example, the sending module 720 is further configured to send a second indication signaling to the terminal. The second indication signaling includes a second indication field. The second indication field is configured to indicate the first number and the second number.

In an example, the first number is configured to indicate a first quantity of control channel elements (CCEs) that are occupied respectively in at least two beam directions in a physical downlink control channel (PDCCH) that transmits the DCI; and the second number is configured to indicate a second quantity of the CCEs during at least one of rate matching or decoding of the DCI in a process of receiving.

In an example, the first number includes a single value. The single value is configured to indicate the number of the CCEs occupied respectively by the DCI transmitted in at least two beam directions, and the number of the CCEs occupied respectively in at least two beam directions is the same.

In an example, the second number is an integer multiple of the single value.

In an example, the integer multiple corresponds to the quantity of the beam directions; or, the second number is equal to the single value.

In an example, the first number includes at least two first values, the at least two first values are configured to indicate the number of the CCEs occupied respectively by the DCI transmitted in different beam directions, and at least two of the beam directions correspond to different numbers of the CCEs.

In an example, the second number is equal to a sum of the first values corresponding to each beam direction in the first number.

In an example, the second number includes at least two second values, and the second values correspond to the first values one to one.

In an example, the correspondences between the second number and the first number are different for different transmission modes of the PDCCH.

In an example, the transmission mode of the PDCCH includes any one of a space division multiplexing method, a frequency division multiplexing method, an intra-slot time division multiplexing method, or an inter-slot time division multiplexing method.

In an example, the transmission mode of the PDCCH includes at least one of: partial content of the DCI being transmitted in each beam direction; or, complete content of the DCI being transmitted in each beam direction.

To sum up, according to the information receiving apparatus and the information sending apparatus provided by the examples of the disclosure, the transmission parameter for the DCI is determined, that is, the first number and the second number for DCI transmission are determined, in this way, the number of blind detections performed by the terminal during receiving the DCI is reduced by determining the first number for the DCI transmission, and the terminal is facilitated to accurately decode the DCI signaling by determining the second number.

Figure 8:
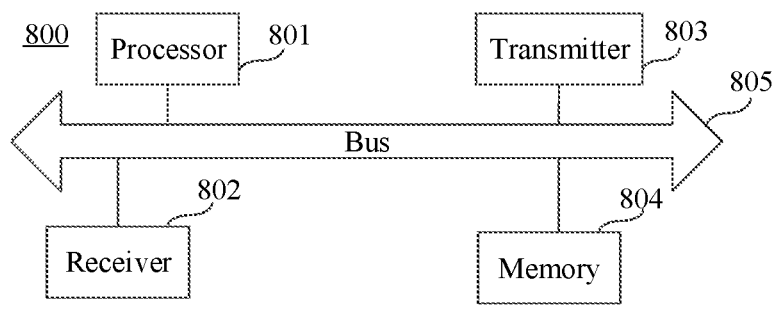
FIG. 8 is a structural block diagram of a communication device according to an example of the disclosure.

FIG. 8 shows a schematic structural diagram of a communication device 800 (a terminal device or a network device) according to an example of the disclosure. The communication device 800 includes a processor 801, a receiver 802, a transmitter 803, a memory 804, and a bus 805.

The processor 801 includes one or more processing cores, and the processor 801 executes various functional applications and information processing by running software programs and modules.

The receiver 802 and the transmitter 803 may be implemented as a communication component, and the communication component may be a communication chip.

The memory 804 is connected with the processor 801 through the bus 805.

The memory 804 may be configured to store at least one instruction, and the processor 801 is configured to execute at least one instruction, so as to implement various steps in the above method examples.

In addition, the memory 804 may be implemented by any type of volatile or nonvolatile storage device or a combination of both. The volatile or nonvolatile storage device includes, but is not limited to a magnetic disk or optional disk, an electrically erasable programmable read only memory (EEPROM), an erasable programmable read only memory (EPROM), a static random access memory (SRAM), a read-only memory (ROM), a magnetic memory, a flash memory, and a programmable read-only memory (PROM).

There is further provided an information transmission system according to an example of the disclosure. The information transmission system includes a terminal device and a network device; the terminal device includes the information receiving apparatus provided by the example shown in FIG. 6; and the network device includes the information sending apparatus provided by the example shown in FIG. 7.

There is further provided a computer readable storage medium according to an example of the disclosure. The computer readable storage medium stores at least one instruction, at least one program, a code set or an instruction set, and the at least one instruction, the at least one program, the code set or the instruction set is loaded and executed by a processor to implement steps executed by a terminal in the information receiving method provided by each method example and steps executed by a network device in the information sending method provided by each method example.

Additional non-limiting examples of the disclosure are shown as follows.

1. An information receiving method performed by a terminal device, comprising: determining a transmission parameter for downlink control information (DCI), wherein the transmission parameter includes a first number and a second number; and receiving the downlink control information (DCI) according to the first number and the second number.

2. The method according to 1, wherein the first number is configured to indicate a first quantity of control channel elements (CCEs) occupied respectively in at least two beam directions in a physical downlink control channel (PDCCH) transmitting the DCI; and the second number is configured to indicate a second quantity of the CCEs during at least one of rate matching or decoding of the DCI in a process of receiving.

3. The method according to 2, wherein the first number comprises a single value, and the single value is configured to indicate the number of the CCEs occupied respectively by the DCI transmitted in the at least two beam directions, and the number of the CCEs occupied in the at least two beam directions is the same.

4. The method according to 3, wherein the second number is an integer multiple of the single value.

5. The method according to 4, wherein the second number corresponds to the quantity of the beam directions; or the second number is equal to the single value.

6. The method according to 2, wherein the first number comprises at least two first values, the at least two first values are configured to indicate the number of the CCEs occupied respectively by the DCI transmitted in different beam directions, and at least two of the beam directions correspond to different numbers of the CCEs.

7. The method according to 6, wherein the second number is equal to a sum of the first values corresponding to each beam direction in the first number.

8. The method according to 6, wherein the second number comprises at least two second values, and the second values correspond to the first values one to one.

9. The method according to any one of 1 to 8, wherein determining the transmission parameter for the downlink control information (DCI) comprises: receiving first indication signaling sent by a network device, the first indication signaling comprising a first indication field, the first indication field is configured to indicate a transmission mode and a transmission number of the PDCCH, wherein the transmission number corresponds to candidate number sets for the first number.

10. The method according to 9, further comprising: determining a target PDCCH candidate carrying the DCI to the terminal device, and determining a number of the CCEs occupied by the target PDCCH candidate as the first number.

11. The method according to 10, further comprising: determining the second number according to the first number and the transmission mode of the PDCCH.

12. The method according to 9, wherein the candidate number sets for the first number corresponding to different beam directions are the same or different.

13. The method according to 9, wherein the transmission mode of the PDCCH comprises any one of a space division multiplexing method, a frequency division multiplexing method, an intra-slot time division multiplexing method, or an inter-slot time division multiplexing method.

14. The method according to 9, wherein the transmission mode of the PDCCH comprises at least one of: partial content of the DCI being transmitted in each beam direction; or, complete content of the DCI being transmitted in each beam direction.

15. The method according to any one of 1 to 8, wherein determining the transmission parameter for the downlink control information (DCI) comprises: receiving second indication signaling sent by a network device, the second indication signaling comprises a second indication field, the second indication field is configured to indicate the first number and the second number.

16. The method according to any one of 2 to 8, wherein each of the at least two beams corresponds to different reference signals; and the reference signals correspond to reference signals for different transmission reception points of a serving cell, respectively; or the reference signals correspond to reference signals for the serving cell and a neighboring cell, respectively.

17. An information sending method performed by a network device, comprising: determining a transmission parameter for downlink control information (DCI), wherein the transmission parameter includes a first number and a second number; and sending the downlink control information (DCI) according to the first number and the second number.

18. The method according to 17, further comprising: sending first indication signaling to a terminal, the first indication signaling comprises a first indication field, the first indication field is configured to indicate a transmission mode and a transmission number of a PDCCH, wherein the transmission number corresponds to candidate number sets for the first number.

19. The method according to 17, further comprising: sending second indication signaling to a terminal, the second indication signaling comprises a second indication field, the second indication field is configured to indicate the first number and the second number.

20. The method according to any one of 17 to 19, wherein the first number is configured to indicate a first quantity of control channel elements (CCEs) occupied respectively in at least two beam directions in a physical downlink control channel (PDCCH) transmitting the DCI; and the second number is configured to indicate a second quantity of the CCEs during at least one of rate matching or coding of the DCI in a process of sending.

21. The method according to 20, wherein the first number comprises a single value, the single value is configured to indicate the number of the CCEs occupied respectively by the DCI transmitted in the at least two beam directions, and the number of the CCEs occupied in the at least two beam directions is the same.

22. The method according to 21, wherein the second number is an integer multiple of the single value.

23. The method according to 22, wherein the second number corresponds to the quantity of the beam directions; or the second number is equal to the single value.

24. The method according to 20, wherein the first number comprises at least two first values, the at least two first values are configured to indicate the number of the CCEs occupied respectively by the DCI transmitted in different beam directions, and at least two of the beam directions correspond to different numbers of the CCEs.

25. The method according to 24, wherein the second number is equal to a sum of the first values corresponding to each beam direction in the first number.

26. The method according to 24, wherein the second number comprises at least two second values, and the second values correspond to the first values one to one.

27. The method according to 18, wherein the transmission mode of the PDCCH comprises at least one of: partial content of the DCI being transmitted in each beam direction; or, complete content of the DCI being transmitted in each beam direction.

28. The method according to 18, wherein the transmission mode of the PDCCH comprises any one of a space division multiplexing method, a frequency division multiplexing method, an intra-slot time division multiplexing method, or an inter-slot time division multiplexing method.

29. An information receiving apparatus applied to a terminal device, comprising: a processing module, configured to determine a transmission parameter for downlink control information (DCI), wherein the transmission parameter includes a first number and a second number; and a receiving module, configured to receive the downlink control information (DCI) according to the first number and the second number.

30. An information sending apparatus applied to a network device, comprising: a processing module, configured to determine a transmission parameter for downlink control information (DCI), wherein the transmission parameter includes a first number and a second number; and a sending module, configured to send the downlink control information (DCI) according to the first number and the second number.

31. A terminal device, comprising: a processor; a transceiver connected with the processor; and a memory configured to store processor-executable-instructions; wherein the processor is configured to load and execute the processor-executable-instructions so as to implement the information receiving method according to any one of 1 to 16.

32. A network device, comprising: a processor; a transceiver connected with the processor; and a memory configured to store processor-executable-instructions; wherein the processor is configured to load and execute the processor-executable-instructions so as to implement the information sending method according to any one of 17 to 28.

33. A non-transitory computer readable storage medium, storing at least one instruction, at least one program, a code set or an instruction set, wherein the at least one instruction, the at least one program, the code set or the instruction set is loaded and executed by a processor to implement the information receiving method according to any one of 1 to 16, or to implement the information sending method according to any one of 17 to 28.

It needs to be understood that the reference to "more than one" in this disclosure refers to two or more than two. "And/or" describes an association relationship of associated objects, which means that there may be three kinds of relationships. For example, "A and/or B" may represent "the existence of A alone," "the simultaneous existence of A and B," or "the existence of B alone." The character "/" generally indicates that the associated objects are in an "or" relationship.

Other examples of the disclosure will be apparent to those skilled in the art from consideration of the specification and practice of the disclosure. The disclosure is intended to cover any variations, uses, or adaptations of the disclosure following its general principles and including such departures from the disclosure as come within the known or customary practice in the art. The specification and examples are considered as instances, and the true scope and spirit of the disclosure are indicated by the following claims.

It should be understood that the disclosure is not limited to the exact structure that has been described above and illustrated in the accompanying drawings, and various modifications and changes may be made without departing from its scope. It is intended that the scope of the disclosure is limited by the appended claims.

What is claimed is:

1. A method for receiving information, performed by a terminal device, the method comprising:
   receiving first indication signaling sent by a network device, wherein the first indication signaling comprises a first indication field, the first indication field is configured to indicate a transmission mode and a transmission number of a physical downlink control channel (PDCCH), and the transmission number corresponds to candidate number sets for a first number;
   determining a search unit for control channel elements (CCEs) according to the candidate number sets;
   searching for each PDCCH candidate on the PDCCH by using the search unit;
   determining a target PDCCH candidate carrying downlink control information (DCI) to the terminal device, and determining a number of the CCEs occupied by the target PDCCH candidate as the first number, wherein the first number comprises a single value, and the single value is configured to indicate a number of the CCEs occupied respectively by the DCI transmitted in at least two beam directions;
   determining a second number according to the first number and the transmission mode of the PDCCH, wherein the second number is an integer multiple of the single value; and
   receiving the DCI according to the first number and the second number.

2. The method according to claim 1, wherein
   the second number is configured to indicate a second quantity of the CCEs during at least one of rate matching or decoding of the DCI in a process of receiving.

3. The method according to claim 2, wherein the first number comprises at least two first values, the at least two first values are configured to indicate a number of the CCEs occupied respectively by the DCI transmitted in different beam directions, and at least two of the beam directions correspond to different numbers of the CCEs;
   wherein the second number is equal to a sum of the first values corresponding to each beam direction in the first number; or wherein the second number comprises at least two second values, and the second values correspond to the first values one to one.

4. The method according to claim 1, wherein
   the second number corresponds to a quantity of the beam directions; or
   the second number is equal to the single value.

5. The method according to claim 1,
   wherein the candidate number sets for the first number corresponding to different beam directions are the same or different;
   wherein the transmission mode of the PDCCH comprises any one of a space division multiplexing method, a frequency division multiplexing method, an intra-slot time division multiplexing method or an inter-slot time division multiplexing method; or
   wherein the transmission mode of the PDCCH further comprises at least one of:
      partial content of the DCI being transmitted in each beam direction; or complete content of the DCI being transmitted in each beam direction.

6. The method according to claim 1, wherein the method further comprises:
receiving second indication signaling sent by the network device, wherein the second indication signaling comprises a second indication field, and the second indication field is configured to indicate the first number and the second number.

7. The method according to claim 1, wherein
each of the at least two beam directions corresponds to different reference signals; and
the different reference signals correspond to reference signals for different transmission reception points of a serving cell respectively; or the different reference signals correspond to reference signals for the serving cell and a neighboring cell respectively.

8. A non-transitory computer readable storage medium, storing at least one instruction, the at least one instruction, when executed by one or more processors of a terminal device, causes the terminal device to perform the method according to claim 1.

9. A method for sending information, performed by a network device, the method comprising:
sending first indication signaling to a terminal, wherein the first indication signaling comprises a first indication field, the first indication field is configured to indicate a transmission mode and a transmission number of a physical downlink control channel (PDCCH), and the transmission number corresponds to candidate number sets for a first number;
determining a transmission parameter for downlink control information (DCI), wherein the transmission parameter comprises the first number and a second number, the first number comprises a single value, the single value is configured to indicate a number of control channel elements (CCEs) occupied respectively by the DCI transmitted in at least two beam directions, and the second number is an integer multiple of the single value; and
sending the DCI according to the first number and the second number.

10. The method according to claim 9, further comprising:
sending second indication signaling to the terminal, wherein the second indication signaling comprises a second indication field, and the second indication field is configured to indicate the first number and the second number.

11. The method according to claim 9, wherein
the second number is configured to indicate a second quantity of the CCEs during at least one of rate matching or decoding of the DCI in a process of sending.

12. The method according to claim 9, wherein
the second number corresponds to a quantity of the beam directions; or
the second number is equal to the single value.

13. The method according to claim 9, wherein the first number comprises at least two first values, the at least two first values are configured to indicate a number of the CCEs occupied respectively by the DCI transmitted in different beam directions, and at least two of the beam directions correspond to different numbers of the CCEs; or wherein the second number is equal to a sum of the first values corresponding to each beam direction in the first number; or wherein the second number comprises at least two second values, and the second values correspond to the first values one-to-one.

14. The method according to claim 9, wherein the transmission mode of the PDCCH comprises at least one of: partial content of the DCI being transmitted in each beam direction; or complete content of the DCI being transmitted in each beam direction; or
wherein the transmission mode of the PDCCH further comprises any one of a space division multiplexing method, a frequency division multiplexing method, an intra-slot time division multiplexing method, or an inter-slot time division multiplexing method.

15. A network device, comprising:
one or more processors;
a transceiver connected with the one or more processors; and
a memory configured to store processor-executable instructions;
wherein the one or more processors are collectively configured to execute the method according to claim 9.

16. A non-transitory computer readable storage medium, storing at least one instruction, the at least one instruction, when executed by one or more processors of a terminal device, causes the terminal device to perform the method according to claim 9.

17. A terminal device, comprising:
one or more processors;
a transceiver connected with the one or more processors; and
a memory configured to store processor-executable instructions;
wherein the one or more processors are collectively configured to:
receive first indication signaling sent by a network device, wherein the first indication signaling comprises a first indication field, the first indication field is configured to indicate a transmission mode and a transmission number of a physical downlink control channel (PDCCH), and the transmission number corresponds to candidate number sets for a first number;
determine a search unit for control channel elements (CCEs) according to the candidate number sets;
search for each PDCCH candidate on the PDCCH by using the search unit;
determine a target PDCCH candidate carrying downlink control information (DCI) to the terminal device, and determine a number of the CCEs occupied by the target PDCCH candidate as the first number, wherein the first number comprises a single value, and the single value is configured to indicate a number of the CCEs occupied respectively by the DCI transmitted in at least two beam directions;
determine a second number according to the first number and the transmission mode of the PDCCH, wherein the second number is an integer multiple of the single value; and
receive the DCI according to the first number and the second number.

* * * * *